US006648288B2

(12) United States Patent
Matthes

(10) Patent No.: US 6,648,288 B2
(45) Date of Patent: Nov. 18, 2003

(54) HOLDING DEVICE FOR HOLDING A PREFERABLY PLATE-SHAPED COMPONENT

(75) Inventor: Joachim Matthes, Kirchlengern (DE)

(73) Assignee: Paul Hettich GmbH & Co., Kirchlengern (DE)

( * ) Notice: Subject to any disclaimer, the term of this patent is extended or adjusted under 35 U.S.C. 154(b) by 0 days.

(21) Appl. No.: 09/968,893

(22) Filed: Oct. 3, 2001

(65) Prior Publication Data

US 2002/0043602 A1 Apr. 18, 2002

(30) Foreign Application Priority Data

Oct. 4, 2000 (DE) ........................................ 200 16 997

(51) Int. Cl.[7] .................................................. E06B 7/28
(52) U.S. Cl. ....................................................... 248/250
(58) Field of Search ............................. 248/250, 309.1, 248/316.7, 316.8, 475.1, 488

(56) References Cited

U.S. PATENT DOCUMENTS 4,049,226 A * 9/1977 Harvey ....................... 248/248
4,290,575 A * 9/1981 Swartwout .............. 248/316 D
4,322,051 A * 3/1982 Shepard ....................... 248/235
4,691,887 A * 9/1987 Bessinger .................... 248/250
4,732,358 A * 3/1988 Hughes et al. .............. 248/243
4,765,575 A * 8/1988 Bergl et al. ................. 248/250
4,909,465 A * 3/1990 Lyman ........................ 248/250
5,195,708 A * 3/1993 Marsh ......................... 248/250
5,384,198 A * 1/1995 Hodges ....................... 248/466
5,509,634 A * 4/1996 Gebka et al. ............ 248/316.7
5,695,163 A * 12/1997 Tayar ......................... 248/243
6,105,794 A * 8/2000 Bauer ...................... 211/94.01
2001/0010134 A1 * 8/2001 Shoemaker et al. .......... 40/607
2002/0039476 A1 * 4/2002 Sauve et al. ................ 385/134

* cited by examiner

*Primary Examiner*—Anita King
*Assistant Examiner*—A. Joseph Wujciak, III
(74) *Attorney, Agent, or Firm*—Barnes & Thornburg

(57) ABSTRACT

A holding device includes two shaped parts which can be fixed on mutually opposite walls of a piece of furniture. The shaped parts have several slide-in grooves which extend toward one another at various angular positions and into which a preferably plate-shaped component can be slid to a stop.

3 Claims, 7 Drawing Sheets

5
4
2
3
1

3
5
6
7
10
11
8
12
17
9
13
III 15
14
16

14
5
16
15
3

HOLDING DEVICE FOR HOLDING A PREFERABLY PLATE-SHAPED COMPONENT

BACKGROUND AND SUMMARY OF THE INVENTION

The present invention relates to a holding device for holding a preferably plate-shaped component between two mutually opposite walls of a piece of furniture.

It is an object of the invention to provide a holding device of the above-mentioned type which can be produced in a simple and cost-effective manner and opens up multiple possibilities for holding a preferably plate-shaped component between two mutually opposite walls of a piece of furniture.

According to the invention, this object is achieved by two shaped parts which can be fixed on mutually opposite walls of a piece of furniture. The shaped parts have several slide-in grooves which extend toward one another at various angular positions and into which a preferably plate-shaped component can be slid to a stop.

To this extent, the holding device consists of two shaped parts which can be produced in a simple manner and at reasonable cost and have several slide-in grooves which, because of their different angular positions with respect to one another, open up the possibility of fixing a plate-shaped component in the most varied usage positions at a piece of furniture.

As soon as a plate-shaped component has been inserted into the slide-in grooves to a stop, this component can then only be pulled out of the two shaped parts opposite the original slide-in direction. The thickness of the plate-shaped component in the areas which engage in the grooves corresponds to the clear width of these grooves. Stops are provided to determine the slide-in depth.

As a result of the design of the holding device according to the invention, the plate-shaped component can be mounted rapidly and without effort in various angular positions on a piece of furniture.

In the case of a horizontal sliding-in, the plate-shaped component can be used, for example, as a table top and, in the case of a vertical or approximately vertical sliding-in, it can be used as a rear wall or closing flap, as a projection wall or the like.

Other objects, aspects and novel features of the present invention will become apparent from the following detailed description of the invention when considered in conjunction with the accompanying drawings.

DETAILED DESCRIPTION OF THE PREFERRED EMBODIMENTS

Figure 1:
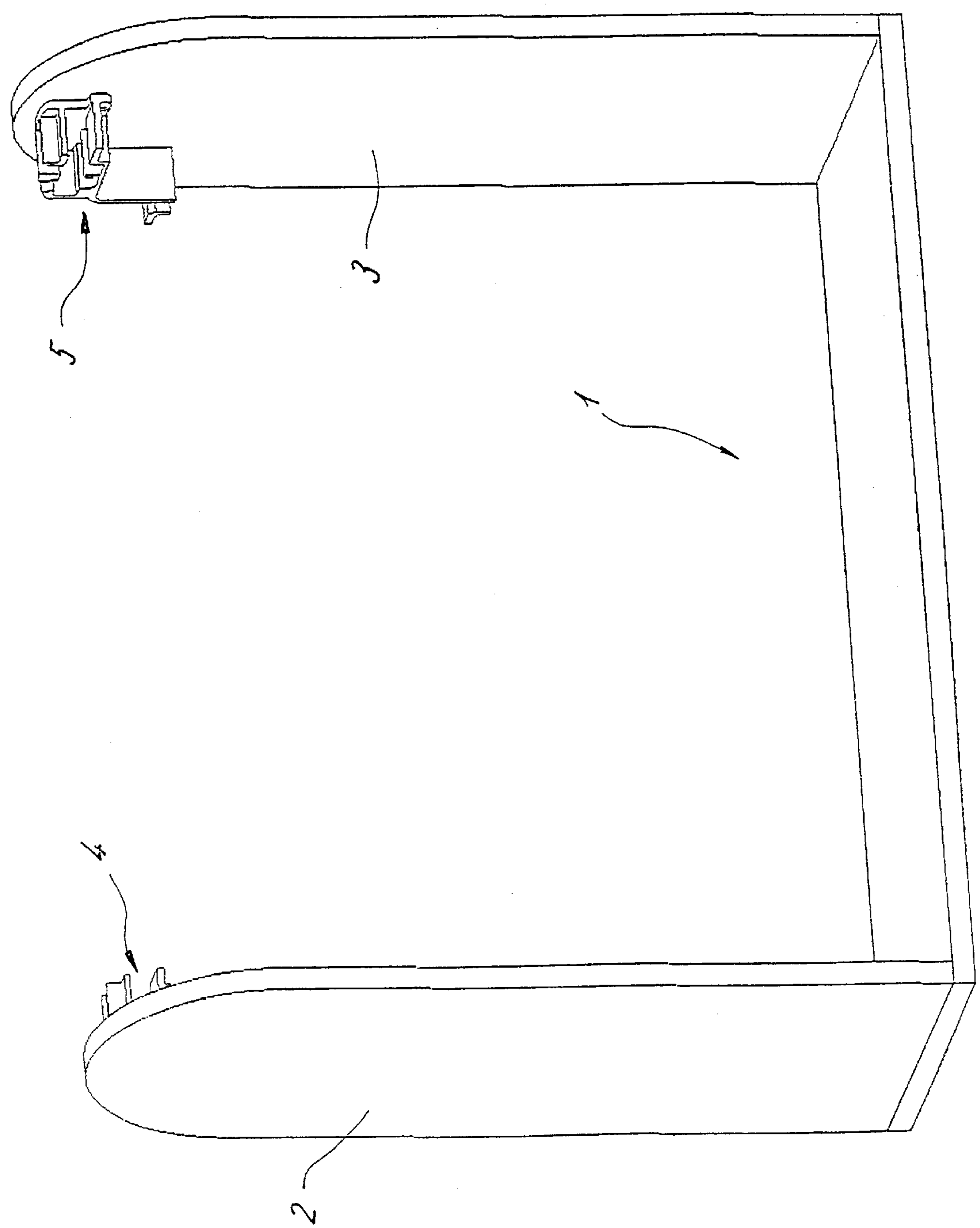
FIG. 1 is a perspective schematic representation of a piece of furniture with two mutually opposite walls and a holding device according to invention fastened to these walls.

As an example, FIG. 1 shows a piece of furniture, which on the whole has the reference number 1 and has two mutually opposite walls 2 and 3. One shaped part 4 and 5 respectively of a holding device are fastened on the mutually opposite walls 2 and 3, for holding a preferably plate-shaped component therebetween.

The two shaped parts 4 and 5 are preferably on the whole each produced in one piece, for example, as a plastic preform or as a metal die casting.

The two shaped parts 4 and 5 have a mirror-inverted construction with respect to one another.

Figure 2:
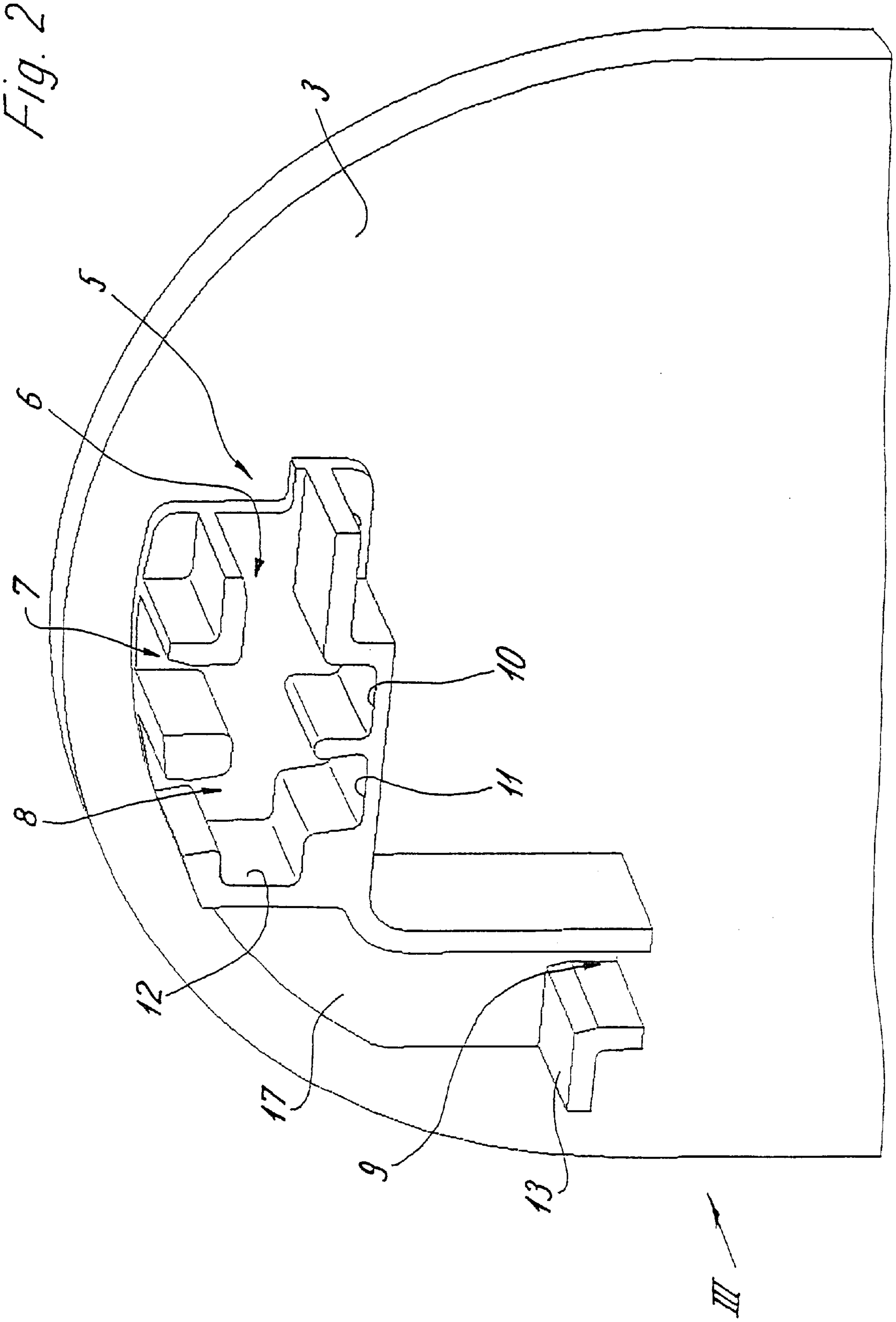
FIG. 2 is an enlarged perspective view, of a shaped part of the holding device.
Figure 3:
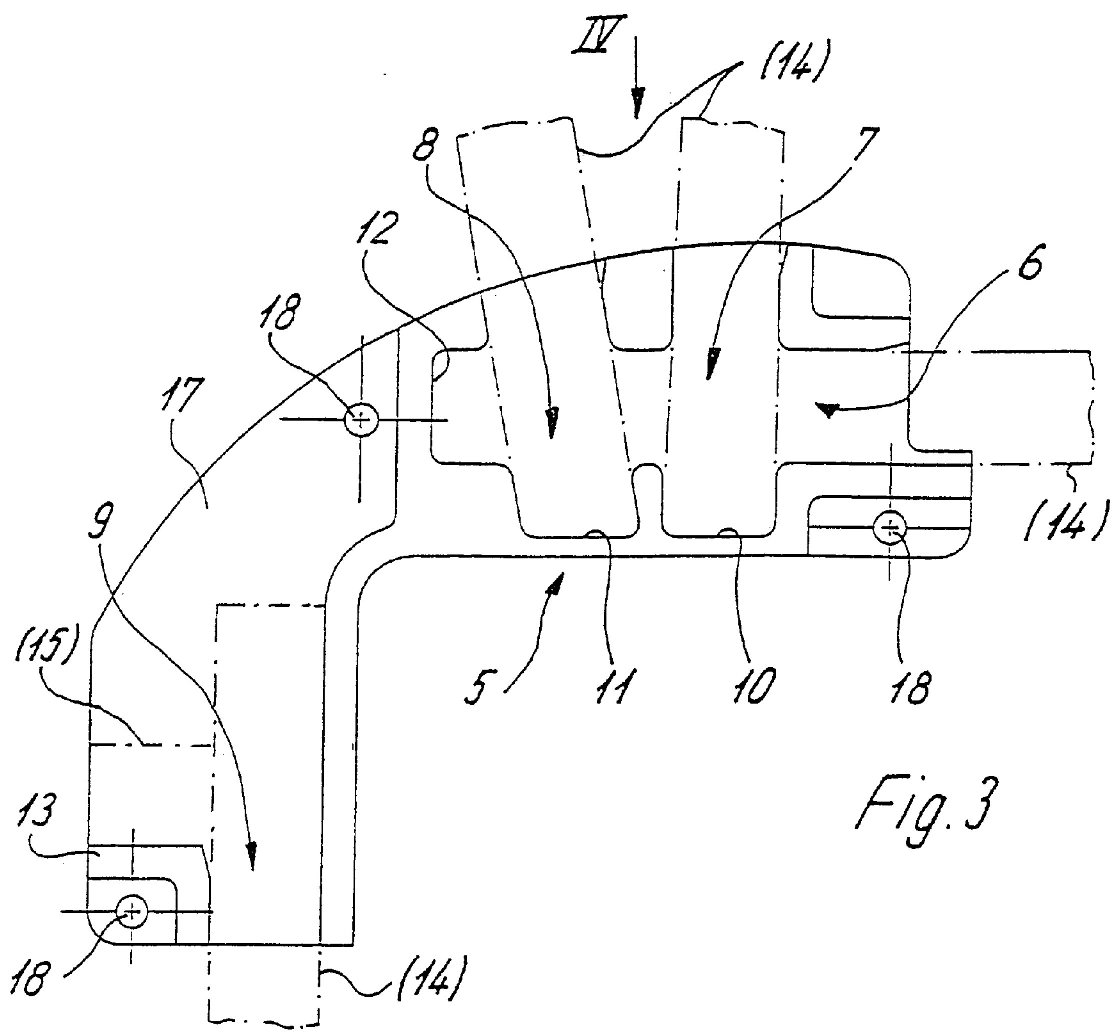
FIG. 3 is a view of the shaped part in the direction of arrow III in FIG. 2.

Each shaped part 4 or 5 is equipped with several slide-in grooves 6 to 9 which extend at different angular positions with respect to one another, which is particularly clearly illustrated in FIGS. 2 and 3.

In the illustrated embodiment, the slide-in grooves having the reference numbers 6 and 9 extend in the horizontal and vertical direction respectively. The slide-in groove marked with the reference number 7 also extends vertically, and the slide-in groove marked with the reference number 8 extends at an angle which is inclined with respect to the vertical line.

It should be explicitly pointed out here that the number and the course of the slide-in grooves 6 to 9 can be almost arbitrarily changed in comparison to the illustrated embodiment. For example, groove 9 may also extend at an angle with respect to the vertical line like groove 8.

The slide-in grooves marked with the reference numbers 6, 7 and 8 are bounded in the slide-in direction by end stops 12, 10, and 11, respectively.

The slide-in groove which has the reference number 9, extends vertically and is continuously open, has an abutment 13 adjacent to its upper end area, which acts as a stop.

The end stops 10 to 12 of the slide-in grooves 6 to 8 determine the slide-in depth of a plate-shaped component 14.

Figure 8:
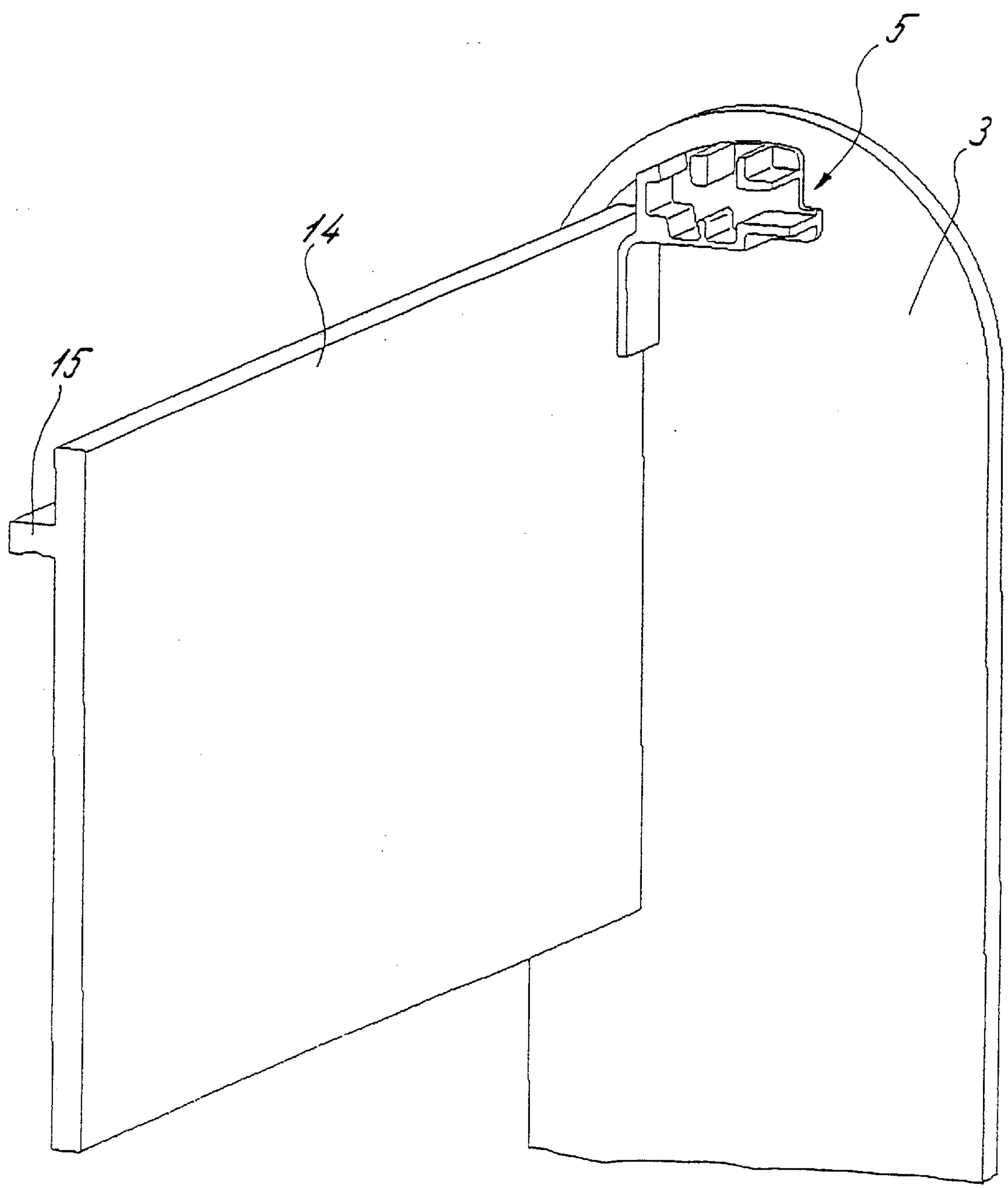
FIG. 8 is a view corresponding to FIGS. 5 to 7, in which case here the plate-shaped component is illustrated in another possible slide-in position.

For fixing the position of a plate-shaped component 14 in the slide-in groove 9 as shown in FIG. 8, the plate-shaped component 14 is equipped with a cam or a stop ledge 15 (FIG. 5) for engagement or support on the stop or abutment 13. The cam or ledge 15 may also be positioned to engage the tops of grooves 7 and 8 and limit the slide-in depth to less than that limited by stops 10 and 11.

Figure 5:
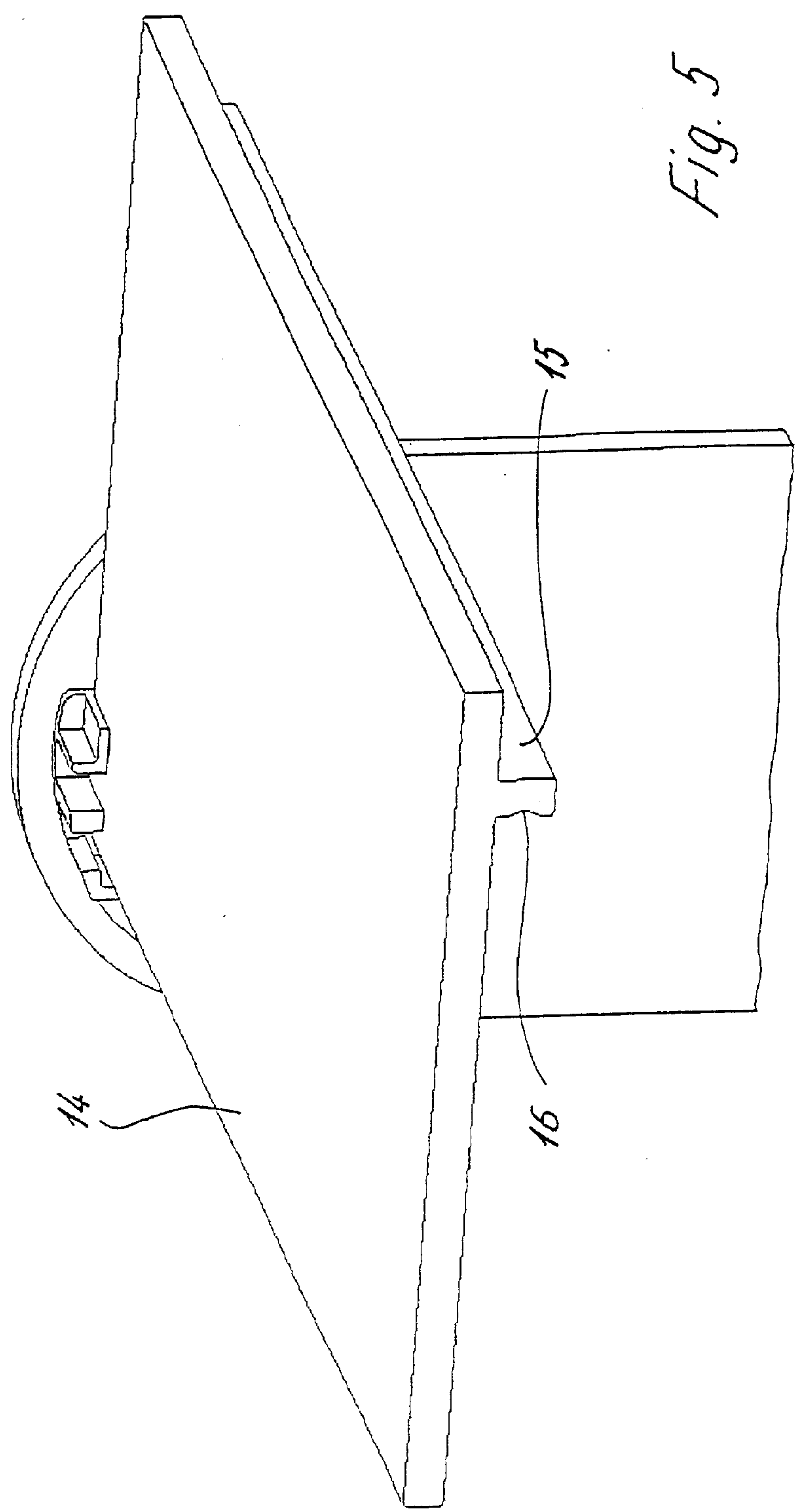
FIG. 5 is a perspective view which corresponds essentially to FIG. 2 and has a plate-shaped component slid into a horizontally extending slide-in groove.
Figure 6:
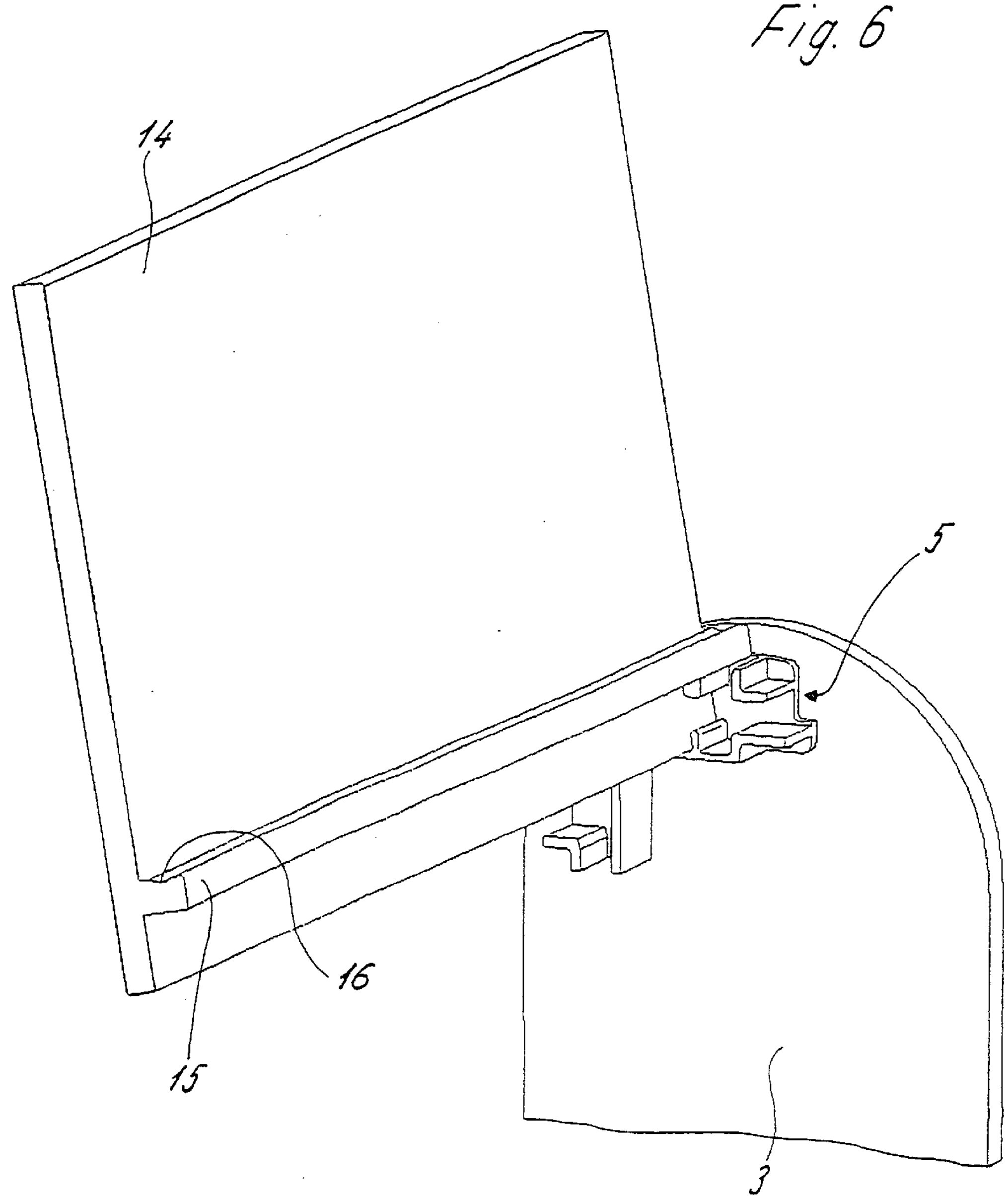
FIG. 6 is a view which corresponds essentially to FIG. 5, in which case here a plate-shaped component is inserted into a slide-in groove of the shaped part which is inclined with respect to the vertical line.
Figure 7:
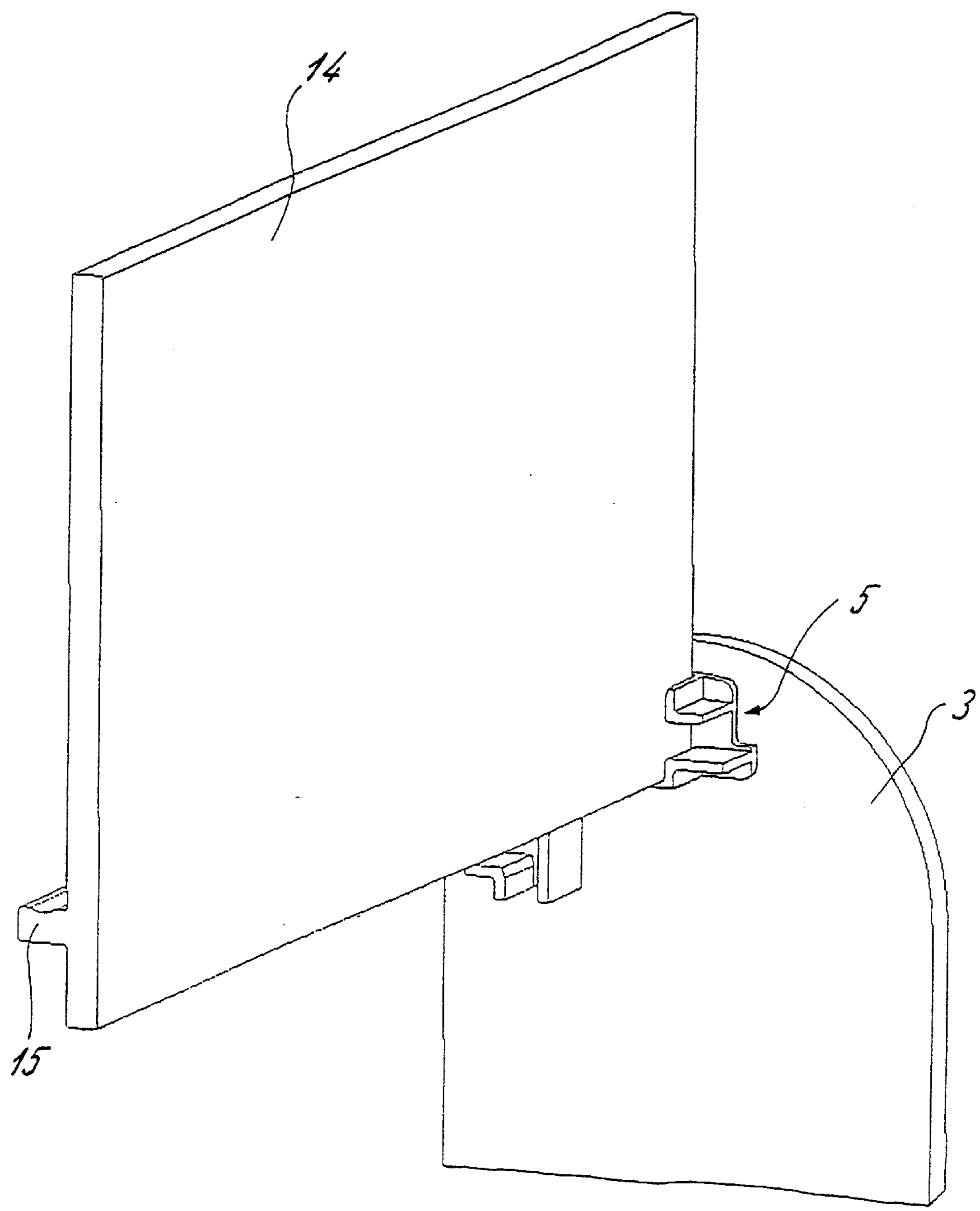
FIG. 7 is a view of another slide-in position of a plate-shaped component which corresponds to FIGS. 5 and 6.

FIG. 3 shows a plate-shaped slide-in part 14, by means of dash-dotted lines, in four slide-in positions;

FIGS. 5 to 8 are each perspective representations of a plate-shaped component 14 slid into the different slide-in grooves 6 to 9. FIG. 5 shows the plate-shaped component 14 in horizontal groove 6. FIGS. 6 and 7 show that the stop ledge 15 of the component 14, which is inserted in the vertical groove 7 or almost vertical groove and position 5, can also be used as a depositing ledge for writing utensils or as a supporting web for pictures, drawings or the like. This can be further facilitated by providing a recess 16 at least in the area of a side flank of the stop ledge 15.

Figure 4:
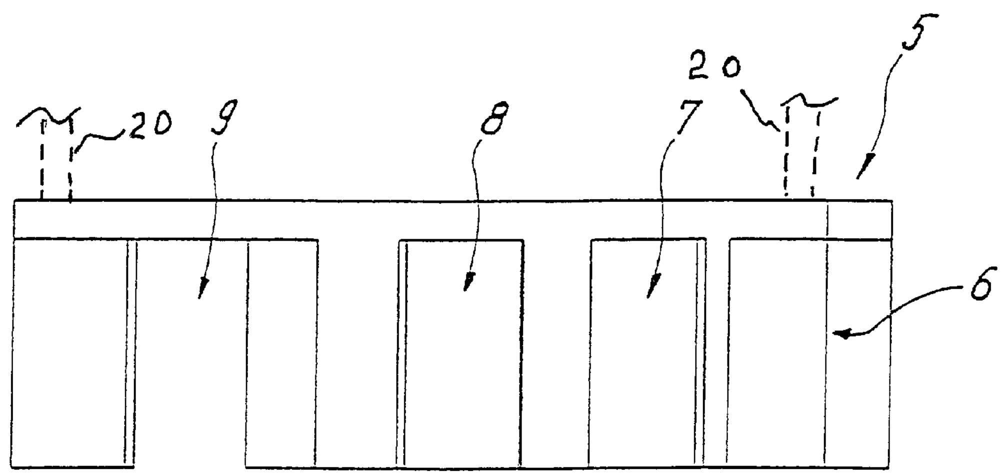
FIG. 4 is a view in the direction of the arrow IV in FIG. 3.

The two shaped parts 4 and 5, which are constructed in a mirror-inverted manner with respect to one another, have a base plate 17 with, for example, several passage bores 18 for fastening screws used for the fixing to a wall 2 or 3 of a piece of furniture 1 (FIG. 3). However, the base plates 17 may also be provided on the backside with dowel-type pins 20 shown in phantom in FIG. 4, which can be driven into corresponding bores of a wall 2 or 3.

It is also conceivable that the shaped parts 4 or 5 are glued by way of their base plates 17 to a wall 2 or 3 of a piece of furniture 1.

If the furniture side wall 2, 3 are to be produced from a plastic material, the shaped parts 4, 5 can naturally also be molded to the furniture walls 2,3; thus, can be produced in one piece with the walls 2, 3.

The wall regions, which bound the described slide-in grooves 6 to 9 and furthermore form the end stops 10 to 12, extend perpendicular to the respective base plates 17.

On the whole, the holding device consists of two shaped parts 4 and 5 which can be produced at reasonable cost, are preferably manufactured in one piece and, in addition, can easily be fastened to mutually opposite walls 2 and 3 of a piece of furniture 1. The holding device offers multiple possibilities for fixing an essentially plate-shaped component 14. An additional advantage being that this plate-shaped component 14 can be fixed in a simple and comfortable manner in different usage position by way of the described holding device.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A holding device for holding a plate-shaped component between two mutually opposite walls of a piece of furniture, the holding device comprising:

two shaped parts to be fixed on mutually opposite walls of a piece of furniture; and each shaped part having several stops and having several slide-in grooves which extend toward one another at various angular positions and into which a plate-shaped component can be slid to the stop, and wherein at least some of the slide-in grooves extend horizontally and some of slide-in grooves extend inclined with respect to vertical or horizontal line.

2. The holding device according to claim 1, wherein the slide-in grooves are provided with end stops in the slide-in direction, for determining the slide-in depth.

3. A holding device for holding a plate-shaped component between two mutually opposite walls of a piece of furniture, the holding device comprising:

two shaped parts to be fixed on mutually opposite walls of a piece of furniture; and each shaped part having several stops and having several slide-in grooves which extend toward one another at various angular positions and into which a plate-shaped component can be slid to the stop, and wherein a slide-in groove which extends vertically or sloped with respect to vertical, is continuously open and includes an abutment adjacent to an upper end area as a stop for a cam or ledge on a component to be slid in.

* * * * *